United States Patent [19]

Dehlen

[11] 4,184,584
[45] Jan. 22, 1980

[54] BUCKET ELEVATOR

[75] Inventor: Bengt L. A. Dehlén, Trelleborg, Sweden

[73] Assignee: Trelleborgs Gummifabriks Aktiebolag, Trelleborg, Sweden

[21] Appl. No.: 814,970

[22] Filed: Jul. 12, 1977

[30] Foreign Application Priority Data

Jul. 16, 1976 [SE] Sweden ............................. 7608146

[51] Int. Cl.² ............................................. B65G 47/40
[52] U.S. Cl. ...................................... 198/706; 415/5; 415/6; 416/7
[58] Field of Search ............... 198/906, 702, 796, 700, 198/703; 415/5, 6, ; 416/7

[56] References Cited

FOREIGN PATENT DOCUMENTS

| | | | |
|---|---|---|---|
| 11850 | of 1929 | Australia | 198/706 |
| 252176 | 1/1970 | U.S.S.R. | 198/706 |

Primary Examiner—Robert B. Reeves
Assistant Examiner—Douglas D. Watts
Attorney, Agent, or Firm—Beveridge, DeGrandi, Kline & Lunsford

[57] ABSTRACT

The disclosure relates to bucket elevators of the type having a series of rotatably mounted buckets carried by and extending between spaced apart, parallel traction chains or belts. The traction chains or belts are, at the discharge station, disposed to run up over guide rollers, the cam surface of the discharge station consisting of a circular cam surface concentric with the guide rollers, and the cam follower surface of each bucket consisting of a corresponding arcuate cam follower surface, in order that the buckets abut with their arcuate cam follower surface against the circular cam surface of the guide rollers during the passage of the traction chains or belts over the guide rollers of the discharge station.

4 Claims, 4 Drawing Figures

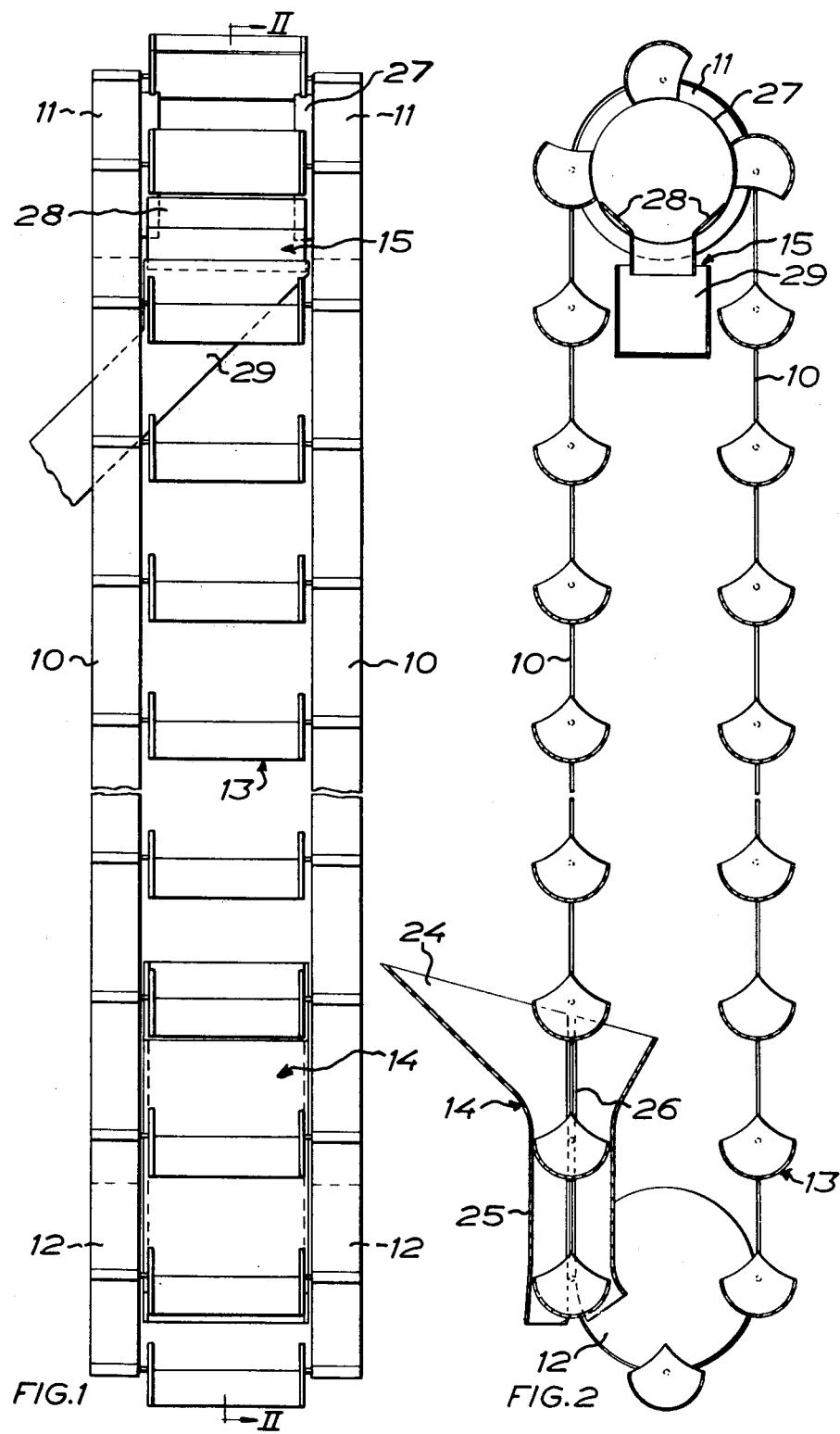

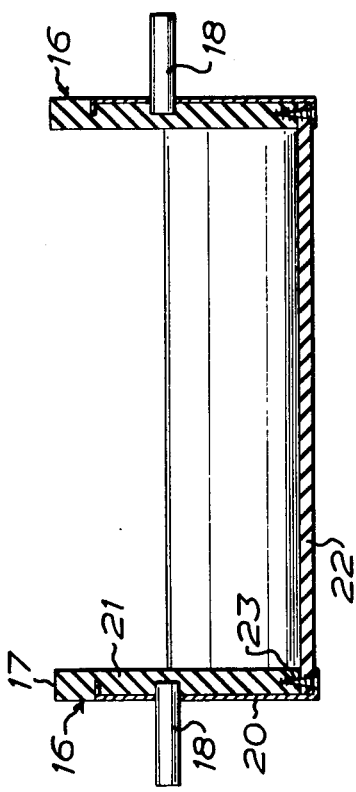
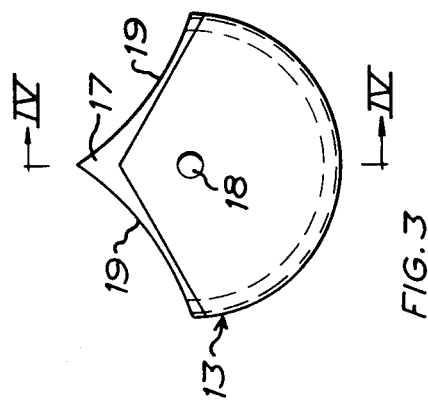

BUCKET ELEVATOR

The present invention relates to bucket elevators of the type which has a series of rotatably mounted buckets carried on and extending between two spaced apart parallel traction chains or belts which are disposed to run over guide rollers and move the buckets along a path of travel through a loading station and a discharge station.

According to the invention, the traction chains or belts are, at the discharge station, disposed to run up over guide rollers, the guide rollers at the discharge station including a circular cam surface concentric with the guide rollers, and the cam follower surface of each bucket consisting of a corresponding arcuate cam follower surface in order that the buckets abut with their arcuate cam follower surface against the circular cam surface of the guide rollers during the passage of the traction chains or belts over the guide rollers of the discharge station.

The present invention and its aspects will be more readily understood from the following description of the accompanying drawings and discussion relating thereto.

In the accompanying drawings:

FIG. 1 is a front elevation of an example of an apparatus according to the present invention;

FIG. 2 is a section taken along the line II—II in FIG. 1;

FIG. 3 is an end elevation of a bucket included in the bucket elevator according to FIGS. 1 and 2; and FIG. 4 is a section taken along the line IV—IV in FIG. 3.

As is apparent from the drawings, the bucket elevator according to the present invention has two belts 10 running beside each other and running over upper and lower guide rollers 11 and 12, respectively. A number of buckets 13 are rotatably mounted between the belts. The belts move the buckets through a loading station 14 and up to a discharge station 15 which is disposed at the upper guide rollers 11.

As is apparent from FIGS. 3 and 4, the buckets are approximately semi-cylindrically shaped with end walls 16 which extend, from an approximately semi-cylindrical lower portion to an upstanding point 17 above stub shafts 18 fixedly mounted on each end wall. The both edges 19 of the upstanding point 17 are concave-arcuate. The end walls 16 of the buckets have an outer sheet metal reinforcement 20 and an inner elastomer lining 21 which preferably consists of heavy-duty rubber. The sheet metal reinforcement 20 terminates below the arcuate edges 19 of the end walls. The stub shafts 18 are welded to the sheet metal reinforcements 20.

The end walls 16 are interconnected by means of a semi-cylindrical bottom 22. This semi-cylindrical bottom may consist of half of a reinforced hose element of suitable rigidity which may have been realized by means of suitable reinforcement. In the illustrated embodiment, the bottom and the end walls are interconnected by means of screws 23.

The belts 10 can consist of, for example, conveyor belts on whose outer surface bearing bushings have been anchored into which the stub shafts 18 of the buckets project so that the buckets can rotate. In this instance, the stub shafts 18 are located such that the buckets tend to hang with their bottoms facing downwardly.

It will be apparent from FIG. 2 that the loading station 14 is in the form of an upwardly directed funnel 24 with a downwardly directed bucket inlet 25. A through-slot 26 is to be found through the end walls of the loading funnel and the bucket inlet, through which slot pass the stubshafts 18 on the buckets. The belts 10 are located outside the funnel 24 and bucket inlet 25 of the loading station. The bucket inlet 25 is of such length that the lower end of the bucket inlet is sealed by a new bucket 13 when the superjacent bucket commences its entry into the conically broadening inlet funnel 24. As a result, it is ensured that the in-fed material is constantly received by a bucket and cannot pass out through the bottom end of the bucket inlet 25. The advantage with this construction is that the buckets 13 need never be provided with an excavating function but merely constantly lift the material up from the loading station 14.

The guide rollers 11 at the discharge station 15 have an inwardly-directed circular cam surface 27 of substantially the same radius as the cam surfaces 19 on the buckets 13. Consequently, the cam surfaces 19 of the buckets will enter into engagement with the cam surfaces 27 such that the buckets are locked and will be tilted over on their movement up over the guide rollers 11. The buckets will hereby be emptied in the discharge station 15. When the buckets are released by the circular cam surface 27, they will automatically pivot to their normal position with the bottom 22 directed downwardly.

The discharge station 15 has guide plates 28 which guide the emptied material down to the outlet 29 of the discharge station which, in the illustrated embodiment, is in the form of an inclined chute.

What I claim and desire to secure by Letters Patent is:

1. In a bucket elevator having a series of rotatably mounted buckets which are journalled for rotation about stub-shafts which are disposed above the point of gravity of the buckets, the buckets being carried by and extending between two spaced apart parallel traction chains or belts which are disposed to run over guide rollers and move the buckets along a path of travel through a loading station and a discharge station with a cam surface for engagement with a cam follower surface on each bucket for pivoting and emptying thereof, the improvement that the traction chains or belts are, at the discharge station, disposed to run up over guide rollers, said guide roller at the discharge station including a circular cam surface concentric with the chain or belt engaging surface of the guide rollers, and the cam follower surface of each bucket includes a corresponding arcuate cam follower surface, in order that the buckets abut and move with their arcuate cam follower surface against the circular cam surface of the guide rollers during the passage of the traction chains or belts over the guide rollers of the discharge station.

2. In a bucket elevator having a series of rotatably mounted buckets which are journalled for rotation about stub-shafts which are disposed above the point of gravity of the buckets, the buckets being carried by and extending between two spaced apart parallel traction chains or belts which are disposed to run over guide rollers and move the buckets along a path of travel through a loading station and a discharge station with a cam surface for engagement with a cam follower surface on each bucket for pivoting and emptying thereof, the improvement that the traction chains or belts are, at the discharge station, disposed to run up over guide rollers, the cam surface of the discharge station including a circular cam surface concentric with the guide rollers, and the cam follower surface of each bucket includes a corresponding arcuate cam follower surface, in order that the buckets abut with their arcuate cam follower surface against the circular cam surface of the guide rollers during the passage of the traction chains or belts over the guide rollers of the discharge station, said buckets being approximately semi-cylindrical and having end walls, wherein said end walls extend, for forming the arcuate cam follower surfaces of said buckets, into an upstanding point above the stub-shaft of each respective end wall, both edges of said upstanding point forming said cam follower surfaces and being concave-arcuate with substantially the same radius as the circular cam surface on the guide rollers disposed at said discharge station.

3. The improvement as recited in claim 2, wherein said buckets consist of a heavy-duty elastomer material and have, on each wall, a sheet metal reinforcement which terminates a distance from the concave-arcuate edges at the upstanding point of the end wall.

4. The improvement as recited in claim 1 wherein said circular cam surface of the guide roller has substantially the same radius as the cam follower surface of each bucket.

* * * * *